Figure 1:
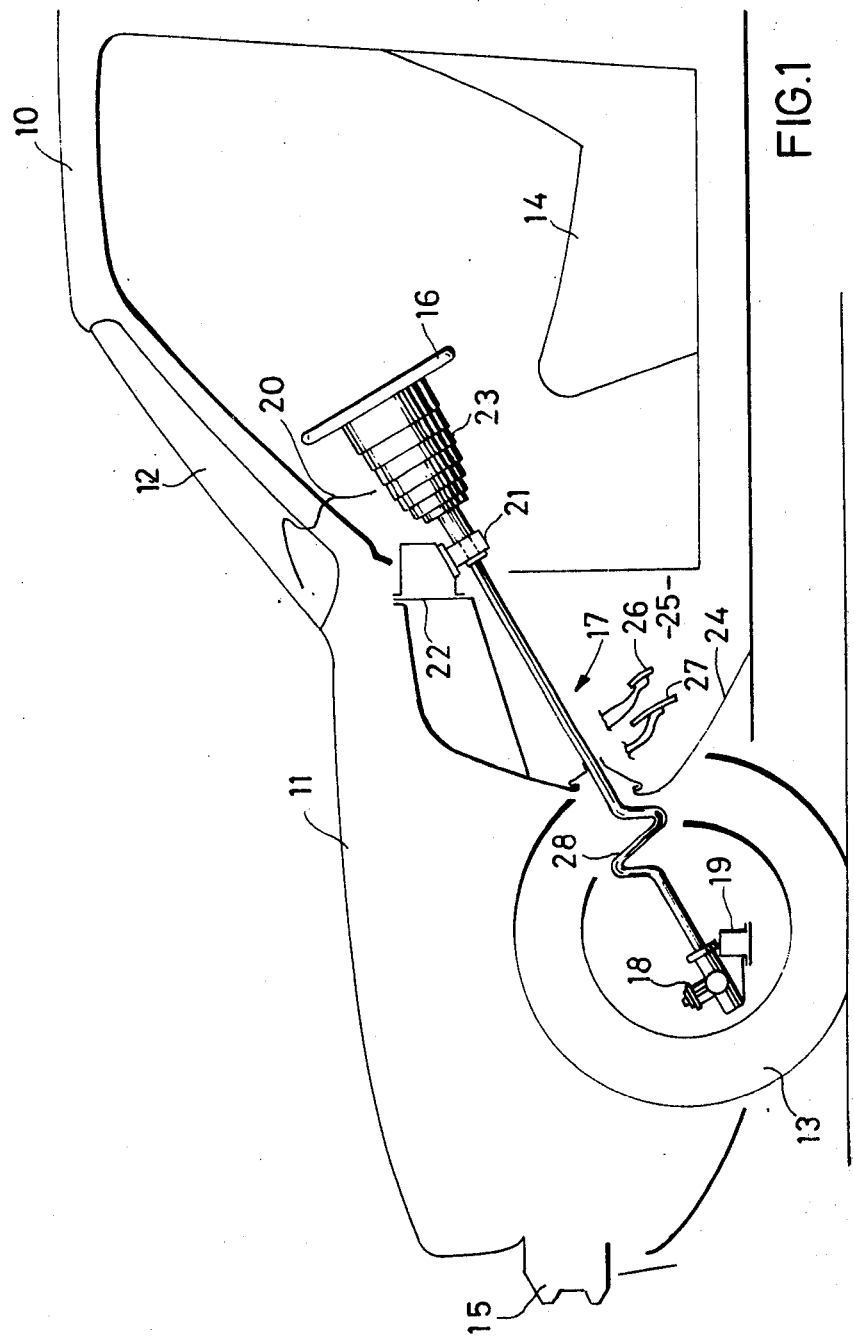

United States Patent [19]

Moos

[11] 3,934,897

[45] Jan. 27, 1976

[54] ENERGY ABSORBING STEERING COLUMN FOR VEHICLES, PARTICULARLY MOTOR VEHICLES

[75] Inventor: Jakob Moos, Oestrich, Rheingau, Germany

[73] Assignee: General Motors Corporation, Detroit, Mich.

[22] Filed: Sept. 9, 1974

[21] Appl. No.: 504,193

[30] Foreign Application Priority Data
Sept. 20, 1973  Germany............................ 2347355

[52] U.S. Cl..................... 280/87 R; 74/492; 180/78; 280/150 B
[51] Int. Cl.².......................................... B62D 1/18
[58] Field of Search............ 280/87 R, 87 B, 150 B; 180/78, 82 R, 79; 74/492, 493

[56] References Cited
UNITED STATES PATENTS

| | | | |
|---|---|---|---|
| 3,396,599 | 8/1968 | Altmann | 74/492 |
| 3,482,466 | 12/1969 | Orlich | 280/87 R X |
| 3,771,379 | 11/1973 | Rohrbach | 74/492 |
| 3,813,961 | 6/1974 | Hug | 74/492 |

Primary Examiner—Robert R. Song
Assistant Examiner—Terrance L. Siemens
Attorney, Agent, or Firm—S. Schwartz

[57] ABSTRACT

A steering column for absorbing impact energy comprising a steering shaft mounted for rotation in a vehicle by an upper bearing. The steering shaft can be turned by a steering wheel operatively connected to the upper end of the shaft by first energy absorbing device which deforms in a controlled manner when impacted. The steering shaft also has an integral helical portion between the upper and lower ends which collapses under a predetermined load if the vehicle is impacted so that the steering wheel remains in position and so that impact energy is absorbed.

4 Claims, 5 Drawing Figures

ENERGY ABSORBING STEERING COLUMN FOR VEHICLES, PARTICULARLY MOTOR VEHICLES

The invention relates to an energy absorbing steering column for vehicles, particularly motor vehicles, having a steering shaft which is permanently deformable under the action of force while absorbing energy, and is provided with means which bring about a collapse of the steering shaft at a certain critical load.

Various kinds of collapsible steering columns are employed in vehicles to absorb impact energy. One well known steering column, for example, consists of a rod which is guided in a tube. On predetermined impact, the rod will shift telescopically into the tube and will thereby shorten the steering shaft. While such design is effective for its intended purpose, its employment results in increased production costs.

Another known arrangement divides the rod of the steering shaft approximately in the middle in such a way that in the event of a stress under impact, the connection between the rod half-portions is destroyed and they are able to shift past each other so that the steering wheel remains in position. The employment of this design also results in increased production costs.

Further, German Pat. specification No. 1,655,581 has disclosed a steering column in which a lattice-form portion in the steering shaft is compressed, in the event of an impact, with the result that the length of the steering shaft is shortened. Here, the disadvantage is the great expenditure of material because the tube walling perforated into lattice configuration, must be made correspondingly thick in order to take up the torsional forces acting on the steering wheel. Moreover, there are high production costs due to expensive cutting tools.

The problem underlying the invention is to create an energy absorbing steering shaft of the above-identified kind which will become deformed in such a way that displacement in the direction of the passenger compartment is not possible. According to the basic concept of the invention, this problem is solved in a surprisingly simple and advantageous manner by arranging that at least in one place and in a manner known per se, the steering shaft is made in the form of helix in such a way that the diameter of the helical convolutions substantially exceeds the diameter of the other steering shaft parts.

From German specification DAS 1 298 010 it is admittedly known per se to arrange that a portion of the steering shaft has a helical configuration. Here however, the tubular steering shaft is interrupted merely by two helically wound bands of sheet steel which are pushed into each other and are connected together at the points of intersection. The diameter of the helical convolutions of the bands does not exceed the diameter of the steering shaft tube. The same also applies to the subject of German Pat. specification DOS 2 052 306, in which the tubular steering shaft is merely corrugated in helical form.

On the other hand, according to the present invention, the steering shaft as such is deformed into a screw, that is, in its entirety, so that the diameter of its convolutions substantially exceeds the diameter of the original material.

It is true that German specification DOS 2 126 173 makes known a steering system in which the steering shaft has a connecting element which has a predetermined eccentricity with respect to the line of action of the transmitted force. However, here it is not a question of a helical deformation of the steering shaft. Furthermore, the known device is formed as a divided steering shaft having two joints at both sides of the eccentrically bent-out steering shaft part.

Although the invention by no means excludes a construction divided by using joints, it is by no means absolutely bound to this. Indeed, the steering shaft may readily assume a one-piece form and the rectilinear portions of the steering shaft which extend at both sides of the screw-like deformation may be aligned with each other.

Again, under collapse in the event of a crash, the screw-form steering spindle needs considerably less space than the steering shaft according to German Pat. specification DOS 2 126 173 where the shaft is just slightly bent out. According to a further feature of the invention, optimum advantage is obtained by the fact that the axis of the screw-like deformation coincides with the axis of the rectilinear steering shaft portions. In this sense, it is also of advantage if the screw-like deformation has one single helical convolution which, depending on the shortening of the vehicle in the event of a predetermined impact, collapses within itself by the same amount, while in the contingency of extreme shortening, the axes move past each other.

As starting material for the steering shaft, including the helical configuration, use is preferably made of a tubular material, although bar material also would be quite suitable for realizing the invention in practice.

The helically shaped part of the steering shaft may be arranged either in the engine compartment or in the passenger space, or even on both sides.

Figure 2:
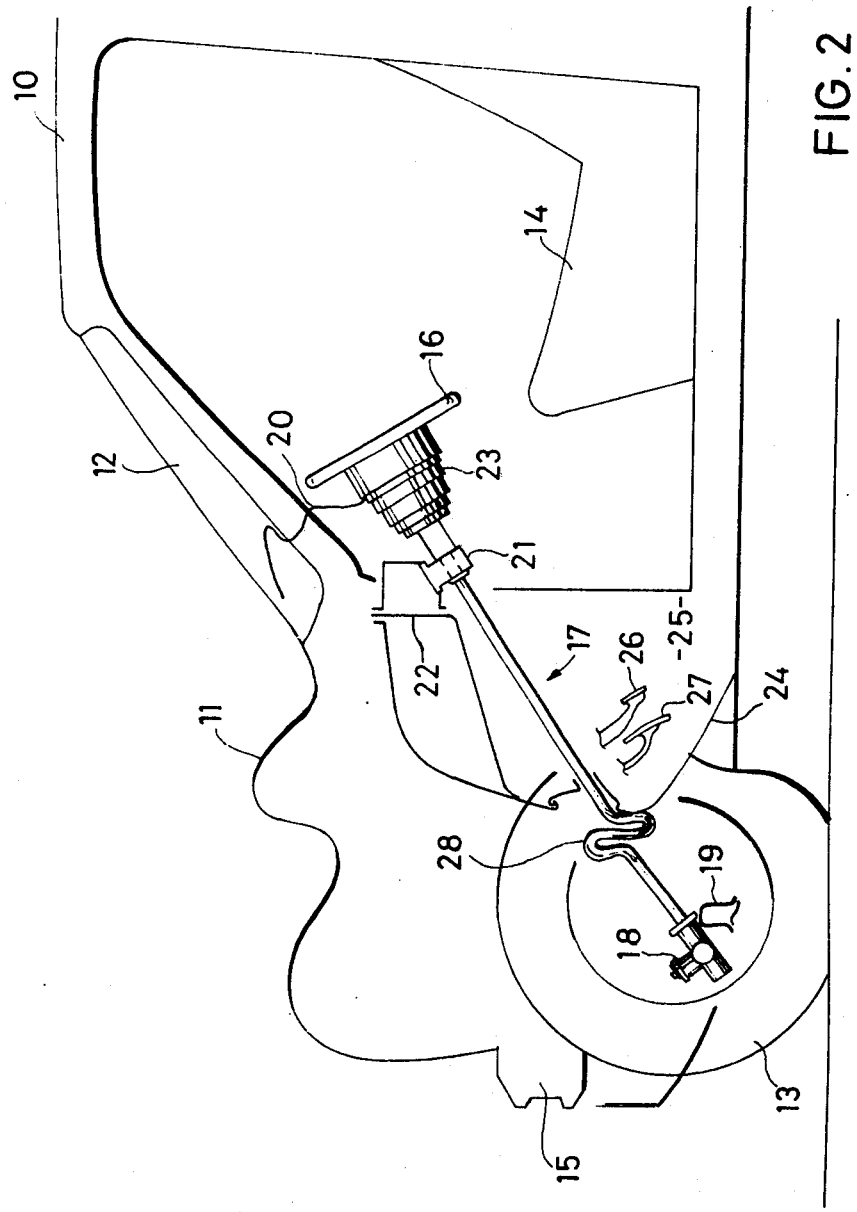
Figure 4:
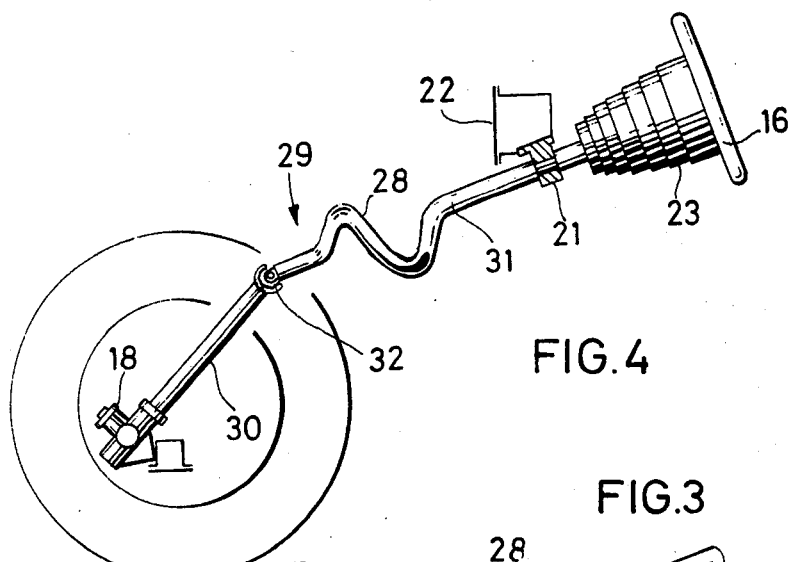
Figure 3:
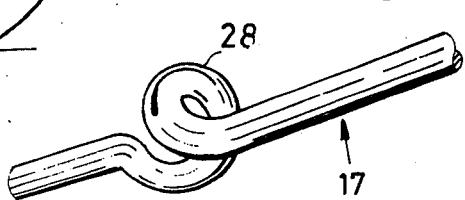
Figure 5:
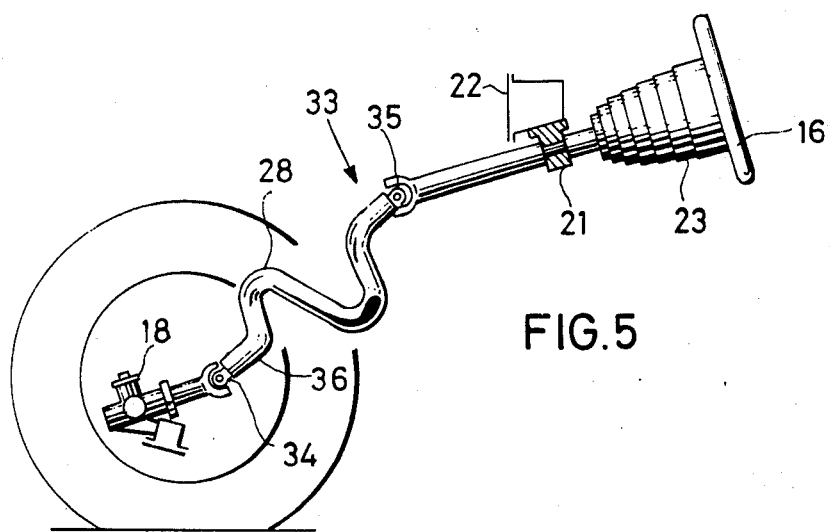

Further details and advantages of the invention will be gathered from the embodiments by way of example, described below and illustrated in the accompanying drawing in which:

FIG. 1 schematically illustrates the front part of a motor vehicle in side elevation;

FIG. 2 the vehicle in FIG. 1 after a frontal impact;

FIG. 3 a portion of the steering shaft in a perspective view;

FIG. 4 a steering shaft according to the invention, interrupted by a hinged joint, and FIG. 5 a steering shaft interrupted by two joints.

According to FIGS. 1 and 2, reference numeral 10 designates the roof, 11 the forward part of a passenger vehicle, 12 the windscreen, 13 the left-hand front wheel, 14 the driver's seat and 15 the front bumper. Also apparent from FIGS. 1 and 2 are the steering wheel 16, the steering shaft 17, the steering gear 18 secured to a front cross-member 19 of the frame, and the instrument panel 20. The steering shaft 17 passing below into the steering gear 18 is mounted in an upper bearing 21 which is secured to a reinforcing girder 22. Arranged between bearing 21 and steering wheel 16 is an energy absorbing deformation pot 23 which is intended to deform upon a predetermined load applied thereto in the direction of the steering wheel. In the foot space 25 forwardly bounded by line 24, the clutch pedal 26 and the brake pedal 27 will be apparent.

As will be further seen from FIGS. 1 and 2, and particularly from FIG. 3 also, the one-piece steering shaft 17 consisting of a tube or the like, is shaped in its central region between steering gear 18 and upper bearing 21 in the general form of a screw 28 having a single convolution. What is involved here is a simple planned point of buckling, which can be produced with but slight expenditure and permits a shortening of the steering shaft 17 under supercritical stress or impact load of a predetermined magnitude (e.g., as the result of a frontal impact of the vehicle).

FIG. 2 shows the vehicle from FIG. 1 after such a frontal impact. The forward part 11 has become distorted and the distance between the steering gear 18 and bearing 21 is shortened. The steering shaft 17 supports itself against bearing 21 and at the reinforcing girder 22. The screw-like deformation 28 of the steering spindle 17 has collapsed within itself and meanwhile has absorbed a portion of the kinetic energy of the vehicle.

Similarly, the deformation pot 23 supports itself against bearing 21 and through its distortion it absorbs the energy of an impact load directed against steering wheel 16. Of course, it is also conceivable to replace the deformation pot 23 by some other well known means, for example by a so-called break-away slide, or even by a second screw-like deformation corresponding to the planned buckling point designated by 28. Then, under an impact on the steering wheel 16, the steering shaft 17 would be shortened by loading from above. A collecting band is able to prevent the steering wheel and steering shaft from falling down, after their release from the break-away slide.

As already mentioned, the invention is applicable and of advantage, not only when the steering shaft consists of one piece and runs in a straight line; indeed, it is also of use when, as FIG. 4 shows, the shaft 29 consists of two parts 30, 31 which are connected together through an articulated joint 32. The two parts 30, 31 do not run in one direction. While the part 30 is rectilinear over its entire length, the part 31 has a screw-like formation which corresponds to that of FIGS. 1 to 3, and is likewise designated by 28, in the interests of simplicity. Of course, it is also conceivable to fit an additional screw-like formation in the part 30.

FIG. 5 illustrates a twice-angled shaft 33. The part 36 of steering shaft 33 located between joints 34 and 35, is provided with the screw-like deformation 28 according to the invention. The part 36 is therefore able to shorten itself during an impact, without appreciable forces being exerted on bearing 21.

The energy-absorbing steering column assemblies of this invention may be advantageously employed in small vehicles in which weight and cost are important factors.

While preferred embodiments of this invention have been shown and described, other embodiments will now be readily apparent to those skilled in the art. Accordingly the scope of this invention is set forth by the following claims and not by the embodiments disclosed to illustrate the invention.

What is claimed is:

1. In a vehicle having dirigible road wheels, a steering column assembly comprising elongated and generally cylindrical steering shaft means, said steering shaft means having upper and lower portions, means operatively connecting said lower portion to said road wheels, manual steering means operatively secured in a predetermined position in said vehicle to one end of said upper portion of said steering shaft means, mounting means secured in said vehicle operatively connected to one of said portions of said steering shaft means for supporting said steering shaft means for limited rotation within said vehicle, said lower portion of said steering shaft means having an energy absorbing helical part integrally formed therewith, said helical part having at least 1 convolution, said convolution having a diameter larger than the diameter of the remainder of said steering shaft means, said helical part being adapted to axially collapse in response to an impact load applied to one end of said steering shaft means to absorb impact energy and so that said one end of said steering shaft means and said manual steering means connected thereto substantially remain in position in said vehicle.

2. In a vehicle having dirigible road wheels, a steering column assembly comprising an elongated cylindrical steering shaft, mounting means secured in said vehicle operatively connected to said shaft for supporting said shaft for rotation about a longitudinal axis of said shaft and for inhibiting the longitudinal movement of said shaft, a steering wheel, first deformable energy absorbing means operatively securing said steering wheel to said shaft, mounting means for absorbing the energy of an impact exerted on said steering wheel, said second energy absorbing means for said assembly being formed by an integral and continuous portion of shaft below said support and shaped in the form of a helix of at least one convolution with a diameter larger than the diameter of the remainder of said shaft and deformable in response to an impact load of a predetermined magnitude applied to said shaft to absorb the energy of said impact load.

3. In a vehicle having dirigible road wheels, a steering column assembly, said steering column assembly comprising an elongated cylindrical steering shaft, means operatively connecting one end portion of said steering shaft to said road wheels, manual steering means operatively connected to the other end of said steering shaft, mounting means operatively connected to one portion of said steering shaft for supporting said steering shaft for turning movement to permit said steering shaft to steer said road wheels and to inhibit the movement of said steering shaft along its longitudinal axis, another portion of said steering shaft being integral with said one portion and describing the path of a helix with at least one convolution having a diameter greater than the diameter of the remainder of said steering shaft, said last mentioned portion forming an energy absorbing section of said steering shaft which collapses axially in a controlled manner to reduce steering shaft length in response to an impact load of predetermined magnitude applied to said steering shaft to absorb the energy of the impact load.

4. In a vehicle having dirigible road wheels, a steering column assembly comprising cylindrical steering shaft means, manually operable steering means operatively connected to one end of said steering shaft means and located in a predetermined station in said vehicle, means operatively connecting the other end of said shaft means to said dirigible road wheels, support means operatively connected to one portion of said shaft means between the ends thereof to support said shaft means for rotation in response to turning said manually operable steering means, said shaft means having an integral energy absorbing helical portion, said helical portion having at least one convolution with a diameter larger than the diameter of said steering shaft means which collapses in response to an impact load applied to one end portion of said steering shaft means to absorb impact energy and so that said one end of said steering shaft and said steering means remain in said predetermined station in said vehicle.

* * * * *